July 20, 1926.
C. F. MATTINGLY
1,593,188
MASTER CYLINDER FOR HYDRAULIC BRAKES
Filed Feb. 20, 1926
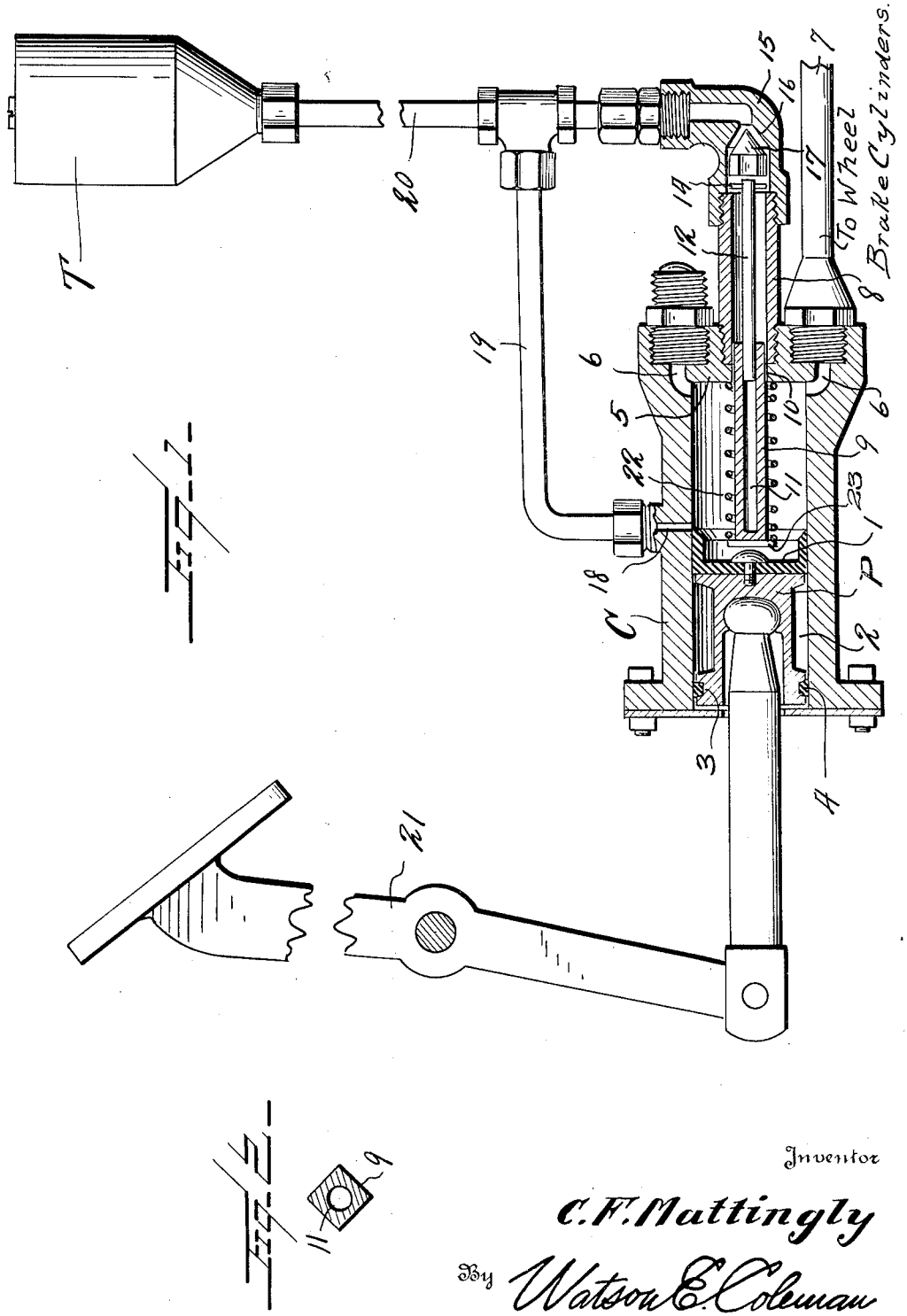
Inventor
C. F. Mattingly
By Watson E. Coleman
Attorney Patented July 20, 1926.

1,593,188

UNITED STATES PATENT OFFICE.

CHARLES F. MATTINGLY, OF ST. LOUIS, MISSOURI, ASSIGNOR TO MATTINGLY AUTOMATIC VALVE CO., OF ST. LOUIS, MISSOURI, A CORPORATION OF MISSOURI.

MASTER CYLINDER FOR HYDRAULIC BRAKES.

Application filed February 20, 1926. Serial No. 89,724.

This invention relates to certain improvements in master cylinders for hydraulic brakes and more particularly to a cylinder of this kind of a self-filling or compensating type, and it is an object of the invention to provide means to permit fluid to enter into the master cylinder from a suitably positioned supply tank to compensate for losses due to leakage or evaporation.

It is also an object of the invention to provide a device of this kind embodying means to eliminate air being drawn into the cylinder around the piston.

Another object of the invention is to provide a device of this kind whereby excessive pressure, which might be due to expansion or overcharging, is permitted to bypass back into the supply tank when the piston working within the master cylinder is in released or outward position.

The invention consists in the details of construction and in the combination and arrangement of the several parts of my improved master cylinder for hydraulic brakes whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view partly in elevation and partly in section and of somewhat a diagrammatic character illustrating a master cylinder constructed in accordance with an embodiment of my invention;

Figure 2 is a cross sectional view taken through the plunger as herein employed.

As disclosed in the accompanying drawing, C denotes a hollow casing or cylinder in the bore of which is arranged a piston P. The inner face of this piston P has suitably secured thereto a packing cup 1 which has close contact with the wall of the bore of the cylinder C.

The central portion of the piston P is cut away to form a cavity 2 extending circumferentially therearound and the outer enlarged end portion of the piston P is provided with a groove 3 extending circumferentially thereof and in which is inserted a packing ring 4 also having close contact with the wall of the bore of the cylinder.

The permanent head 5 of the cylinder is provided with the outlet ports or passages 6 with which are operatively engaged the pipes 7 leading to the several brake cylinders. As the particular type of brake cylinders and brake mechanism proper forms no part of the present invention it is not believed that a detailed disclosure is necessary.

In the central portion of the permanent head 5 is threaded or otherwise engaged an end portion of an elongated nipple or shell 8 in the bore of which is slidably engaged through the inner end thereof a plunger 9, the permanent head 5 having an opening 10 through which said plunger is directed. This plunger 9 is provided axially thereof with a bore 11 open at its inner or inserted end and in which slidably extends a rod 12. The outer end of this rod 12, considered in relation to the plunger 9, is provided with a cross pin 14 of a length in excess of the diameter of the bore of the shell or nipple 8 and thereby contacting with the outer end of said shell or nipple to provide a stop for the rod.

Coupled to the outer end portion of the shell or nipple 8 is an L fitting 15 provided with the internal valve seat 16 with which is adapted to engage the valve member 17. This valve member 17 is slidably mounted within the bore of the fitting 15 between the valve seat 16 and the outer end of the shell or nipple 8. The periphery of the outer end of the valve member 17 is angular in form to provide for a free passage of fluid therearound and still of sufficient diameter to allow the wall of the bore of the fitting to serve as a guide for the valve member.

The wall of the cylinder C has disposed through the upper portion thereof a port 18 from which leads a tube 19 coupled to and discharging within a pipe line 20 leading from the supply tank T. This pipe line 20 is also in communication with the fitting 15 outwardly of the internal valve seat 16.

As illustrated in Figure 1 of the accompanying drawing, the piston P is in its outward or release position and at which time the fluid within the tank T is free to flow by gravity down through the pipe line 20 through the fitting 15 and around the plunger 9 into the cylinder C. At the same time, the fluid is free to flow from the tank T through the tube 19 and port 18 into the cylinder. It is also to be noted that when the piston P is in its outward or release position it is in advance of the port 18.

The movement of the piston P through the instrumentality of the pedal 21 or the like closes the port 18 and at the same time the packing cup 1 engages the plunger 9, forcing the same into the bore of the shell or nipple 8 against the tension of the spring 22. The spring 22, as herein disclosed, is of a coil type encircling the plunger 9 and interposed between the permanent head 5 of the cylinder C and an enlargement 23 carried by the inner end portion of the plunger.

As the plunger is moved by the piston P it carries with it the rod 12 causing said rod to contact with the valve member 17 and move the same against its seat 16 thus closing all communication between the supply tank T and the cylinder C. The continued inward movement of the piston P causes the fluid in the master cylinder to be displaced through the ports 6 to the wheel cylinders of the brakes (not shown).

After the piston P has been moved inwardly a predetermined distance, the peripheral cavity 2 is brought into communication with the supply tank T through the port 18 and tube 19 resulting in such cavity being filled with fluid from the tank T. The fluid is retained within said cavity 2 by the packing cup 1 and the packing ring 4 resulting in a fluid ring around the piston P thereby preventing the possibility of air being drawn into the cylinder C past the packing cup 1. In the event any air should pass the packing ring 4 it will enter the cavity 2 and rise to the top of the fluid therein and remain there until such time as the piston P is moved inwardly a distance sufficient to bring the port 18 into communication with the cavity 2 and at which time the air bubble will pass through the tube 19 and upwardly of the pipe line 20 into the tank T.

Upon release of pressure upon the pedal, the piston P moves outwardly into release position due to the pressure imposed upon the fluid at the brake cylinders (not shown) and as is well known. The return of the piston P is also aided by the tension of the spring 22 imposed upon the plunger 9. This plunger 9 is of such length and the spring 22 of sufficient tension to move the piston P out to its maximum travel or full release.

Upon the first outward or release movement of the piston P, the plunger 9 is caused to follow by means of the spring 22 and said plunger carries the rod 12 back until the pin 14 engages the adjacent end of the shell or nipple 8. This movement of the rod 12 releases the valve member 17 which will remain seated until the fluid pressure in the cylinder C becomes slightly lower than the static pressure of the fluid in the tank T when the valve member 17 will be forced away from its seat 16 by pressure in the tank T and thus permitting fluid to enter the cylinder C to replenish such losses as may have occurred through leakage or evaporation.

As soon as the piston P reaches its maximum outward travel, the packing cup 1 frees or clears the port 18 and thus opening direct communication between the tank T and the cylinder C through the tube 19 so that any overpressure or expansion of fluid due to climatic changes will be bypassed back into the tank T through the port 18 and tube 19.

The bore 11 of the plunger 9 is charged or filled with fluid at all times, said fluid being drawn in around the rod 12 as it is withdrawn. The passage around the rod 12 within the bore 11 is restricted to such an extent that a pressure is created on the fluid within the bore 11 before it begins to force out around rod 12 and this pressure acting against the inserted end of the rod 12 causes such rod to move until it strikes the valve 17 to carry such valve until it rests against its seat 16. As the plunger 9 continues to move to the right, the rod 12 is forced back into the bore 11 dispelling the fluid out around the rod 12. On the backward stroke of the piston P and the plunger 9, the rod 12 is withdrawn from the bore 11 creating a partial vacuum in said bore 11 which causes the fluid to be again drawn into the bore 11 until it becomes full.

From the foregoing description it is thought to be obvious that a master cylinder for hydraulic brakes constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising, in combination, a cylinder, a piston working therein, a tank, a pipe line leading from the tank to the cylinder and communicating therewith in advance of the piston, a second pipe line leading from the cylinder in advance of the piston, said cylinder being provided in its wall with a vent, the piston being positioned outwardly of said vent when in full release position, means for moving the piston within the cylinder, a bypass line leading from the vent to the first named pipe line, a valve interposed in the first named pipe line between the piston and the connection between the first named pipe line and the bypass line, said valve being open when the piston is in release position, and means operated by the piston for closing said valve upon inward movement of the piston.

2. A device of the class described comprising, in combination, a cylinder, a piston working therein, a tank, a pipe line leading from the tank to the cylinder and communicating therewith in advance of the piston, a second pipe line leading from the cylinder in advance of the piston, said cylinder being provided in its wall with a vent, the piston being positioned outwardly of said vent when in full release position, means for moving the piston within the cylinder, a bypass line leading from the vent to the first named pipe line, a valve interposed in the first named pipe line between the piston and the connection between the first named pipe line and the bypass line, said valve being open when the piston is in release position, and means operated by the piston for closing said valve upon inward movement of the piston, the inward movement of the piston closing the vent.

3. A device of the class described comprising, in combination, a cylinder, a piston working therein, a tank, a pipe line leading from the tank to the cylinder and communicating therewith in advance of the piston, a second pipe line leading from the cylinder in advance of the piston, said cylinder being provided in its wall with a vent, the piston being positioned outwardly of said vent when in full release position, means for moving the piston within the cylinder, a bypass line leading from the vent to the first named pipe line, a valve interposed in the first named pipe line between the piston and the connection between the first named pipe line and the bypass line, said valve being open when the piston is in release position, and means operated by the piston for closing said valve upon inward movement of the piston, said piston being provided circumferentially therearound with a cavity, said cavity communicating with the vent upon predetermined inward movement of the piston.

4. A device of the class described comprising, in combination, a cylinder, a piston therein, means for imparting movement to the piston within the cylinder, a tank, a pipe line leading from the tank and communicating with the cylinder in advance of the piston, a second pipe line leading from the cylinder in advance of the piston, a valve interposed in the first named pipe line and opening to permit flow through said first named pipe line into the cylinder, means operating upon inward movement of the piston to close said valve, said piston being provided circumferentially therearound with a cavity adapted to be filled with fluid, and means for bypassing air entering said cavity.

5. A device of the class described comprising, in combination, a cylinder, a piston working therein, means for moving the piston, a tank, a pipe line leading from the tank and communicating with the cylinder in advance of the piston, a second pipe line in communication with the cylinder in advance of the piston, said first named pipe line being provided with an internal valve seat, a valve member in said line engaging the seat to close flow therethrough, said valve member being in open position when the piston is in its outer or release position, a plunger slidably extending within the cylinder and disposed within the first named pipe line, means for urging said plunger inwardly of the cylinder, said plunger being in the path of travel of the piston when moving in one direction, said plunger being provided with a bore, and a rod telescoping within said bore and having direct contact with the valve member to move said valve member to its seat when the plunger is moved by contact with the piston.

6. A device of the class described comprising, in combination, a cylinder, a piston working therein, means for moving the piston, a tank, a pipe line leading from the tank and communicating with the cylinder in advance of the piston, a second pipe line in communication with the cylinder in advance of the piston, said first named pipe line being provided with an internal valve seat, a valve member in said line engaging the seat to close flow therethrough, said valve member being in open position when the piston is in its outer or release position, a plunger slidably extending within the cylinder and disposed within the first named pipe line, means for urging said plunger inwardly of the cylinder, said plunger being in the path of travel of the piston when moving in one direction, said plunger being provided with a bore, a rod telescoping within said bore and having direct contact with the valve member to move said valve member to its seat when the plunger is moved by contact with the piston, and means for limiting the movement of the rod in the opposite direction.

In testimony whereof I hereunto affix my signature.

CHARLES F. MATTINGLY.